(12) United States Patent
Nakagawa et al.

(10) Patent No.: US 6,925,825 B2
(45) Date of Patent: Aug. 9, 2005

(54) VEHICLE AIR-CONDITIONING SYSTEM

(75) Inventors: Nobuya Nakagawa, Aichi (JP); Hajime Izumi, Takasago (JP); Tetsuo Tominaga, Takasago (JP); Toshihisa Kondo, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 306 days.

(21) Appl. No.: 10/409,170

(22) Filed: Apr. 9, 2003

(65) Prior Publication Data

US 2003/0213579 A1 Nov. 20, 2003

Related U.S. Application Data

(63) Continuation of application No. PCT/JP02/07448, filed on Jul. 23, 2002.

(30) Foreign Application Priority Data

Jul. 23, 2001 (JP) .................................. 2001-221555

(51) Int. Cl.[7] .............................................. B60H 1/32
(52) U.S. Cl. .............................. 62/244; 165/42; 165/43; 454/121
(58) Field of Search ..................... 62/239, 244; 165/42, 165/43; 454/121

(56) References Cited

U.S. PATENT DOCUMENTS 6,048,263 A * 4/2000 Uchida et al. ............. 454/121
6,106,386 A    8/2000 Schwarz
6,293,339 B1 * 9/2001 Uemura et al. ............ 165/203
6,311,763 B1 * 11/2001 Uemura et al. .............. 165/43
6,463,998 B1 * 10/2002 Shindo ...................... 165/204
6,609,563 B1 * 8/2003 Tsurushima et al. ....... 165/204

FOREIGN PATENT DOCUMENTS

| DE | 19539850 A1 | 4/1997 |
|---|---|---|
| DE | 19908998 A1 | 9/1999 |
| EP | 1097828 A2 | 5/2001 |
| GB | 2356046 | 5/2001 |
| JP | 357209415 A * | 12/1982 |

* cited by examiner

Primary Examiner—William E. Tapolcai
Assistant Examiner—Mohammad M. Ali
(74) Attorney, Agent, or Firm—Wenderoth, Lind & Ponack, L.L.P.

(57) ABSTRACT

A vehicle air-conditioning system has an evaporator for receiving air discharged into a casing of the system and changing the air to a cold air flow that can flow rearward, and a heater for selectively receiving at least a portion of the cold air flow and heating such portion to a warm air flow. The system includes partition means for directing the warm air flow to permit mixing of the warm air flow and the remaining cold air flow that bypasses the heater. The partition means includes a top end portion and guide means for downwardly directing the cold, warm, or the mixed cold and warm air which has flowed beyond the top end portion for blowing-out such air out of the system. The top end portion defines a surface having a streamlined or curved configuration along which the cold, warm, or mixed cold and warm air can flow.

32 Claims, 3 Drawing Sheets

VEHICLE AIR-CONDITIONING SYSTEM

REFERENCE TO RELATED APPLICATION

This is a continuation of International Patent Application No. PCT/JP02/07448, filed Jul. 23, 2002.

FIELD OF THE INVENTION

The present invention relates to an air-conditioning system for a vehicle, and more particularly, to such a vehicle air-conditioning system of the type which includes an evaporator and a heater arranged serially in a lengthwise direction of the vehicle.

BACKGROUND ART

In recent years, a vehicle air-conditioning system has been used which incorporates a cooler unit which includes an evaporator, and a heater unit, which includes a heater, as a unitary arrangement wherein the cooler and heater units are arranged serially lengthwise in the vehicle so as to provide an improved space availability in the foot area of the passenger within the vehicle, more particularly, to increase a foot-receiving space, and also to reduce the manufacturing cost. An example of such a vehicle air-conditioning system is disclosed by Japanese Laid Open Patent Application No. 250345/1998.

FIG. 3 illustrates a sectional view of the vehicle air-conditioning system as illustrated and described in the aforementioned application. The air-conditioning system 50 comprises an evaporator 52 for receiving therein an air flow that is discharged through a front portion of the vehicle into a casing of the system by a blower, and for changing the received air flow to a cooled or cold air through a heat exchanging process that can then flow rearward of the evaporator 52 and a heater 54 that is located rearward or downstream of the evaporator 52. The heater 52 receives at least a portion of the cold air flow and heats the portion of the cold air flow to a warm air that can then flow rearward from the heater 56. The air-conditioning system also comprises a partition plate 56 that is disposed rearward or downstream of the heater 54. The partition plate 56 is adapted to direct the warm air flow through the heater 54 upwardly in a manner so as to permit mixing of the warm air flow and the cold air flow being discharged from the evaporator 54 and bypassing the heater 54 thereabove. The air-conditioning system further comprises a guide wall 60 located adjacent to the partition member 56 for downwardly directing the cold air, the warm air or the mixture of cold and warm air which has passed over a top end 58 that is defined by the partition plate 56 for blowing-out such air. The top end 58 of the partition plate 56 may be in the form of a thin plate which is turned or bent forwardly. The air-conditioning system 50 also has three outlets, i.e., a defrost outlet 62, vent outlet 64 and floor outlet 66 as well as five dampers, i.e., a cold air damper 68, a warm air damper 70, a defrost damper 72, a vent damper 74 and floor damper 76.

When it is desired to operate the air-conditioning system in a so-called "bi-level" mode wherein conditioned air is discharged through the vent outlet 64 and warm air is discharged through the floor outlet 66, the defrost damper 72 is closed, the cold air, warm air and vent dampers 68, 70, 72 are half opened, and the floor damper 76 is opened. The degree to which the cold air and warm air dampers 68, 70 are opened can control a ratio of the cold and warm air to be mixed together to thereby adjust the temperature of the mixed air to be discharged. A portion of the cold air passing through the evaporator 52 can flow through the opened cold air damper 68 and then bypass the heater 54 thereabove while the remaining portion of the cold air can flow through the opened warm air damper 70 into the heater 54 where the remaining portion of the cold air is heated and becomes a warm air flow. The warm air flow being discharged rearward from the heater 54 is directed upward while impinging upon the partition plate 56 and is then redirected forwardly by the forwardly bent top end 58 of the partition plate 56. As a result, most of the forward warm air flow can meet the rearward cold air flow bypassing the heater 54 thereabove, thereby resulting in the warm air and cold air flows being mixed so as to provide a conditioned air flow which is then discharged through the vent outlet 64. On the other hand, the remaining portion of the warm air is turned through 180 degrees downwardly in the region of the top end 58 of the partition plate 56 by the vent damper 74 and the guide wall 60 and is then discharged through the floor outlet 66.

The air-conditioning system of the above-mentioned type may, however, produce considerable noise during operation of the system that can impair the operator's comfort in operating the vehicle. The inventors of the present invention have found that the warm air flow through the heater 54 may be separated from the top end portion 58 of the partition plate 56 as the warm air moves upward along the partition plate 56 and flows beyond the top end portion 58, thereby resulting in the creation of an eddy in the region of the top end portion 58 of the partition plate 56 that may lead to the considerable noise that is produced during operation of the system. Moreover, such a separation of the air flow can lead to creation of pressure loss in the air flow and a reduction in the air flow rate.

It is therefore an object of the present invention to provide a vehicle air-conditioning system which is arranged to reduce the noise that results from the separation of flow that is encountered in the conventional air-conditioning system.

Another object of the present invention to provide a vehicle air-conditioning system which is arranged so as to avoid the reduction of the air flow rate to attain a more efficient operation of the vehicle air-conditioning system.

SUMMARY OF THE INVENTION

To this end, the present invention provides an air-conditioning system for a vehicle. The air-conditioning system of the present invention includes an evaporator for receiving air that is discharged into a casing of the system by a blower and changing the discharged air to a cold air flow, where the cold air flow is allowed to be directed rearward. The air-conditioning system also includes a heater that is located downstream of the evaporator for selectively receiving at least a portion of the cold air flow and heating such portion of the cold air flow to a warm air flow. Further, the air-conditioning system includes partition means disposed downstream of the heater for directing the warm air flow upwardly in such a manner as to permit mixing of the warm air flow through the heater and the remaining cold air flow that bypasses the heater. The partition means includes a top end portion and guide means for downwardly directing the cold air, where the partition means is provided for blowing-out the warm air or the mixture of the cold and warm air which has flowed beyond the top end portion of the partition means out of the air-conditioning system. The top end portion of the partition means defines a surface having a streamlined or curved configuration along which the cold air, the warm air or the mixture of the cold and warm air can flow.

In the vehicle air-conditioning system as constructed above, the air that is discharged into the casing of the system by the blower is changed into a cold air by the evaporator. A portion of the cold air can then flow beyond the heater thereabove, whereas the remaining portion of the cold air is heated into warm air by the heater and then flows backward away from the evaporator. It is possible to selectively direct the cold air flow, the warm air flow, or the mixed flow of cold and warm air according to several modes of operation of the present invention. The warm air flowing through the heater is diverted upwardly by the partition means and meets the cold air bypassing the heater thereabove so as to permit mixing of the warm air and cold air to create a conditioned air. The cold air, the warm air or the conditioned air can flow beyond the top end portion of the partition means thereabove and then be redirected downward of the partition means by the guide means for blowing-out. In this case, the cold air flow is directed to impinge angularly upon the top end potion of the partition means. The warm air flows beyond the top end portion of the partition means in such a manner so as to be turned through 180 degrees therearound. Any portion of the cold air, warm air and conditioned air can flow along the streamlined or curved surface of the partition means so that such portion does not separate from the top end portion of the partition means, thereby avoiding the creation of an eddy. As a result, the reduction of noise in the vehicle air-conditioning system can be attained. Also, it is to be understood that no separation of flow can reduce or substantially eliminate the pressure loss in the flow which would otherwise take place, which can contribute to suppression of the reduction of the air flow rate, which in turn can lead to a more efficient operation of the vehicle air-conditioning system.

In the vehicle air conditioning system according to the present invention, the top end portion of the partition means preferably can have a radius of curvature ranging between about 5 and 25 mm.

Also, in the vehicle air-conditioning system according to the present invention, the streamlined or curved configuration of the top end portion surface preferably comprises substantially an airfoil configuration.

Also, in the vehicle air-conditioning system according to the present invention, the top end portion of the partition means preferably is bent forwardly toward a vent outlet of the air-conditioning system.

With the arrangement of the present invention, the warm air flow is directed upwardly by the partition means and then forwardly by the forwardly bent top end portion of the partition means. Thus, it is possible to make a greater angle at which the warm air flow can meet the cold air flow bypassing the heater thereabove, thereby attaining a more efficient and effective mixing of the warm air and cold air flows.

DETAILED DESCRIPTION OF THE INVENTION

A vehicle air-conditioning system or unit according to an embodiment of the present invention will be described with reference to the drawings.

Figure 1:
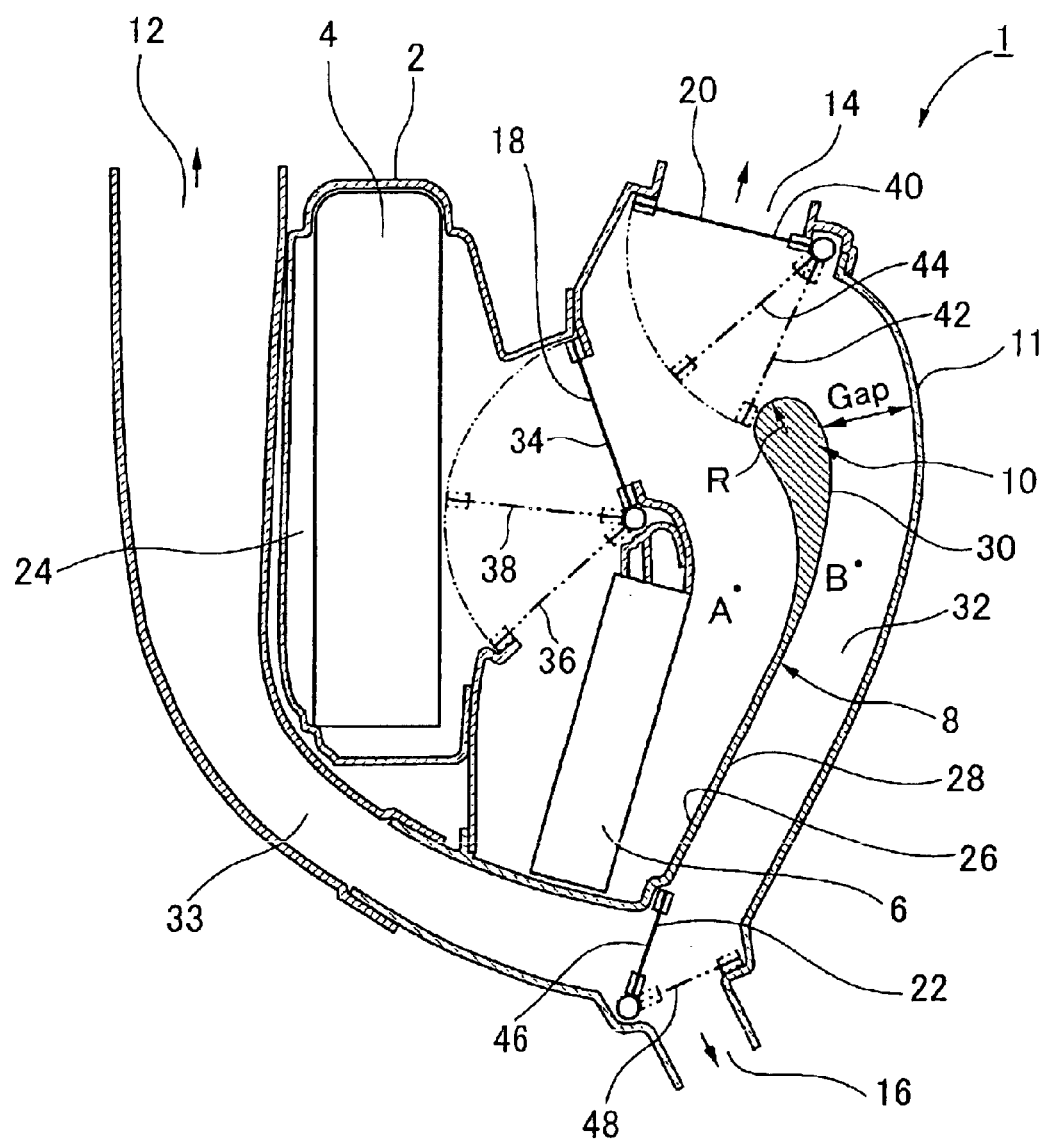
FIG. 1 is a cross sectional view of an embodiment of a vehicle air-conditioning system according to the present invention.

FIG. 1 is a cross-sectional view of a vehicle air-conditioning system 1 that is an embodiment of the present invention. As shown in FIG. 1, the vehicle air-conditioning system 1 comprises a case 2 in which an evaporator 4, a heater 6, a partition plate 8, and a guide wall 11 are mounted therein. The evaporator 4 is provided for cooling air from the front thereof and directing the cooled or cold air in the backward direction. The heater 6 is disposed rearward or downstream of the evaporator 4 and is provided for heating the air from the front thereof and directing the heated or warm air in the backward direction. The partition plate 8 is disposed rearward of the heater 6 and the guide wall 11 for downward directing the cold air, warm air or the mixture of cold and warm air which has flowed backward beyond the top end portion 10 of the partition plate 8. The vehicle air-conditioning system 1 also comprises three outlets (i.e., a defrost outlet 12, a vent outlet 14 and a floor outlet 16) and three dampers (i.e., an air mixing damper 18, a vent damper 20 and a floor damper 22), all of which will be described later.

A void space or plenum 24 is formed within the case 2 in the front of the evaporator 4. This void space 24 is adapted to receive fresh air from the outside and/or air fed by a blower (not shown).

The heater 6 is adapted to take in and heat cold air from the evaporator 4 at the front thereof and to direct the heated or warm air in the backward direction. The ratio of the cold air to be taken in is determined by the position of the air mixing damper 18 that is disposed between the evaporator 4 and the heater 6, the position of which will be described later.

The partition plate 8 has a front face 26 that is opposed to the back of the heater 6, a top end portion 10 and a rear face 28.

The front face 26 of the partition plate 8 is adapted to direct the warm air from the heater 6 in the upward direction such that the warm air from the heater 6 can be mixed with the cold air that bypasses the heater 6 thereabove. The top end portion 10 of the partition plate 8 has a thickness which is sufficient to provide a surface 30 smoothly connecting between the front and rear faces 26, 28. This surface 30 is of a streamlined or curved configuration along which the air can smoothly flow. In this embodiment, this surface 30 is configured to a shape similar to an airfoil. It is preferable that the top end portion 10 of the partition plate 8 has a radius of curvature R ranging between about 5 and 25 mm. Moreover, the top end portion 10 is further bent forwardly toward the vent outlet 14 that is positioned thereabove.

The guide wall 11 is spaced apart from the top end portion 10 of the partition plate 8 and is disposed to extend downward along the top end portion 10 substantially parallel to the rear face 28 of the partition plate 8. As shown in FIG. 1, a duct 32 is defined so as to communicate with the floor outlet 16 between the rear face 28 of the partition plate 8 and the guide wall 11. The duct 32 also communicates with another duct 33 which is formed to extend upward below the heater 6 in the front of the evaporator 4 and the void space 24. This duct 33 communicates with the defrost outlet 12.

The air mixing damper 18 is disposed between the evaporator 4 and heater 6 and is moveable between an upper position 34 as shown by the solid line and a lower position 36 as shown by the two-dot-chain line. It is to be noted that the air mixing damper 18 may be positioned at any intermediate position 38 between the upper and lower positions 34, 36. When the air mixing damper 18 is in its upper position 34, all of the cold air from the evaporator 4 is conducted into the heater 6, thereby discharging only the warm air that is heated by the heater 6 from the vehicle air-conditioning system 1. on the other hand, when the air mixing damper 18 is in its lower position 36, all of the cold air from the evaporator 4 flows above the heater 6, thereby discharging only the cold air from the vehicle air-conditioning system 1. When the air mixing damper 18 is in its intermediate position 38, the cold air bypassed above the heater 6 is mixed with the warm air from the heater 6, thereby discharging the mixture of the cold and warm air from the vehicle air-conditioning system 1. By changing the intermediate position 38 taken by the air mixing damper 18, the ratio of the cold and warm air to be mixed together can be changed so as to adjust the temperature in the mixed air.

The vent damper 20 is disposed adjacent to the vent outlet 14 and is moveable between an upper position 40 as shown by the solid line and a lower position 42 as shown by the two-dot-chain line. It is to be also noted that the vent damper 20 may be positioned at any intermediate position 44 between the upper and lower positions 40, 42. When the vent damper 20 is in its upper position 40, all the cold air, the warm air or the mixture of the cold and warm air will flow into the duct 32. On the other hand, when the vent damper 20 is in its lower position 42, all the cold air, the warm air or the mixture of the cold and warm air will be discharged through the vent outlet 14. When the vent damper 20 is in its intermediate position, the cold air, the warm air or the mixture of the cold and warm air will flow into both the duct 32 and the vent outlet 14.

The floor damper 22 is disposed adjacent to the floor outlet 16 and is moveable between an upper position 46 as shown by the solid line and a lower position 48 as shown by the two-dot-chain line. When the floor damper 22 is in its upper position 46, all the air that passes through the duct 32 will be discharged through the floor outlet 16. On the other hand, when the floor damper 22 is in its lower position 48, all the air that passes through the duct 32 will be discharged from the defrost outlet 12 through the duct 33. The operation of the vehicle air-conditioning system 1 according to this embodiment of the present invention will now be described in connection with three modes.

The discharge of the warm air through the floor outlet 16 in the first warm-air mode will now be described. The air mixing damper 18 is positioned in its upper position 34 while the vent damper 20 is positioned in its upper position 40. Thus, the vent outlet 14 is closed. All of the cold air flowing backward from the evaporator 4 through the air mixing damper 18 is conducted into the heater 6 wherein the cold air is heated so as to form warm air. The warm air moves in the upward direction until it impinges upon the partition plate 8 whereat it is further directed in the upward direction toward the vent direction 14. The warm air flow is then conducted into the duct 32 by means of the vent damper 20, guide wall 11 and so on. When the warm air flows beyond the top end portion 10 of the partition plate 8 and before it turns through about 180 degrees over the top end portion 10, the warm air flows upward along the front face 26 of the partition plate 8 and then flows along the front and rear faces 26, 28 of the top end portion 10 of the partition plate 8. Since the top end portion surface 30 of the partition plate 8 is of a stream-line or curved configuration along which the warm air can smoothly flow along the surface 30, the warm air will not separate from the surface 30 of the top end portion 10 when the warm air flows beyond the top end portion 10 of the partition plate 8. The warm air is then discharged through the floor outlet 16.

Next, the discharge of the cold air through the defrost outlet 12 in the second cold-air mode will be described. The air mixing damper 18 is placed in its lower position 36, the vent damper 20 is positioned in its upper position 40, and the floor damper 22 is located in its lower position 48. AU the cold air from the evaporator 4 flows beyond and above the heater 6 in the presence of the air mixing damper 18. The cold air then flows beyond the top end portion 10 of the partition plate 8 and is conducted into the duct 32 through the vent damper 20, guide wall 11 and so on. When the cold air flows beyond the top end portion 10 of the partition plate 8, the cold air moves angularly or obliquely into impingement with the top end portion 10 of the partition plate 8. However, the cold air will not separate from the top end portion 10 of the partition plate 8 since the surface 30 of the top end portion 10 is of a streamlined or curved configuration along which the cold air smoothly flows. Subsequently, the cold air is discharged from the defrost outlet 12 through the ducts 32, 33.

Finally, the third temperature-regulating mode in which the 20 conditioned air is discharged from the vent outlet 14 and the warm air is discharged from the floor outlet 16 will be described. The air mixing damper 18 is positioned in an intermediate position 38 while the vent damper 20 is positioned in an intermediate position 44. A portion of the cold air flowing backward from the evaporator 4 through the air mixing damper 18 flows beyond and above the heater 6 while the remaining portion of the cold air is conducted into the heater 6 at which the cold air is heated, whereby the heated or warm air then flows backward of the heater 6. The warm air moves in the upward direction until it impinges upon the partition plate 8 whereupon the warm air is directed in the upward direction. Since the top end portion 10 of the partition plate 8 is bent forwardly, the warm air is further directed in the forward direction. As a result, the warm air impinges upon the cold air that bypasses the heater 6 substantially at a right angle. Thus, the cold and warm air are effectively mixed together so as to form a temperature-regulated air. Since the vent damper 20 is in its intermediate position 44, about half of the temperature-regulated air is discharged from the vent outlet 14. The remaining portion of the temperature-regulated air is directed beyond the top end portion 10 of the partition plate 8 in the backward and downward direction by being guided by the vent damper 20 and the guide wall 11. Since the surface 30 of the top partition plate end 10 is of a streamlined or curved configuration along which the cold air smoothly flows and since the temperature-regulated air flows beyond the top partition plate end 10, the flow of the temperature-regulated air will not separate from the top end portion 10 of the partition plate 8 similar to the first warm-air mode and second cold-air mode. Subsequently, the flow of the temperature-regulated air is discharged from floor outlet 16.

In any of the three modes described above, the flow of the warm air, the cold air or the temperature-regulated air will not separate from the top end portion 10 of the partition plate 8 due to the streamlined or curved configuration of the top end portion 10. Thus, the creation of an eddy at the top end portion 10 of the partition plate 8 can be suppressed so as to reduce noise. Moreover, the pressure loss in the air flow can be reduced by preventing the separation of the air flow. Thus, the reduction of the air flow rate can be suppressed so as to operate the vehicle air-conditioning system 1 more effectively. In particular, this is advantageous in the warm-air mode in which the air flow is turned about 180 degrees.

Figure 2:
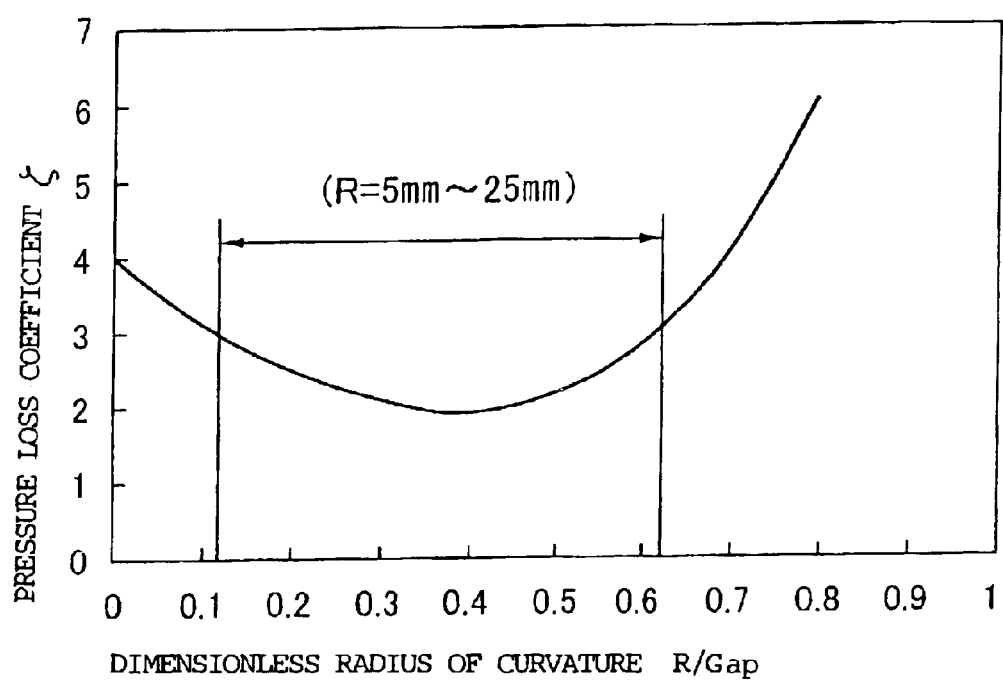
FIG. 2 is a graph illustrating a relationship between the radius of curvature of a guide plate and a pressure loss coefficient.
Figure 3:
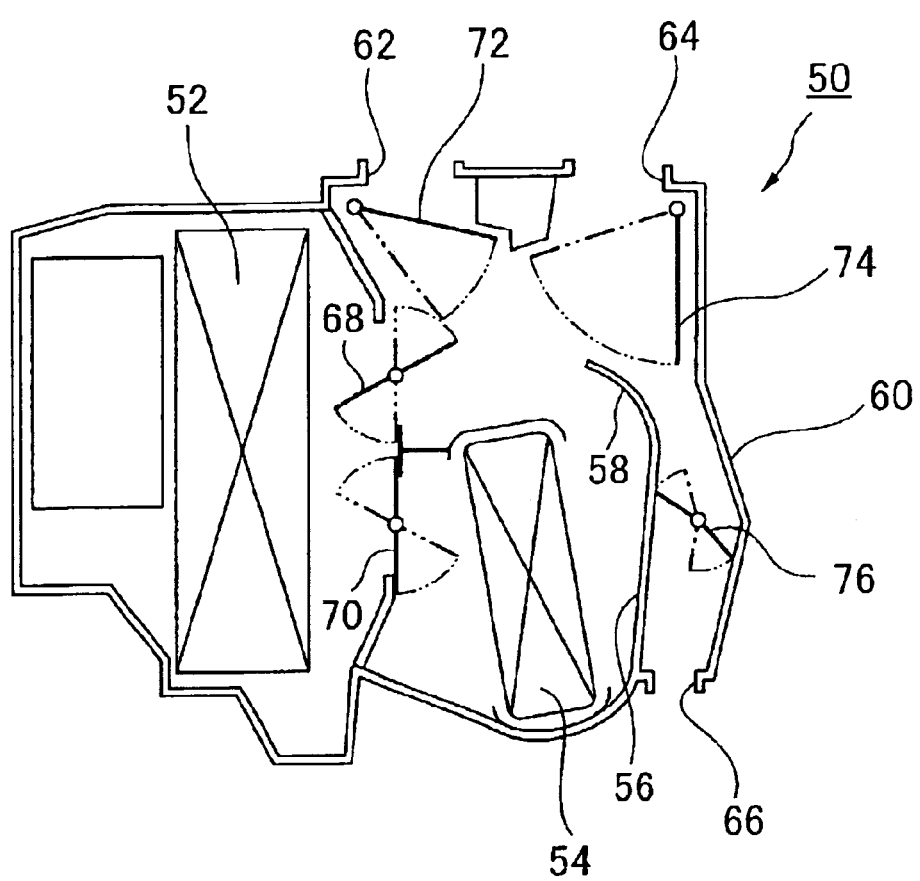
FIG. 3 is a cross sectional view of a conventional vehicle air-conditioning system.

FIG. 2 is a graph illustrating the relationship between the radius of curvature R and the pressure loss coefficient $\zeta$ at the top end portion 10 of the partition plate 8 in a vehicle air-conditioning system 1 according to an embodiment of the present invention. The radius of curvature R is made dimensionless with the distance Gap between the partition plate 8 and the guide wall 11 in the vehicle air-conditioning system 1 (see FIG. 1). In this embodiment, the distance Gap is about 40 mm. The pressure loss coefficient $\zeta$ is a value that is made dimensionless in relation to the loss between points A and B in FIG. 1. When the dimensionless radius of curvature R/Gap is at zero, that is, when the top end portion 58 of a partition plate 56 is not of a streamlined or curved configuration as in a vehicle air-conditioning system 50 according to the conventional system (see FIG. 3), the pressure loss coefficient $\zeta$ is 4, as shown in FIG. 2. On the other hand, when the dimensionless radius of curvature R/Gap is between about 0.12 and 0.63, that is, the radius of curvature R is between about 5 and 25 mm, the pressure loss coefficient $\zeta$ is 3 or less. Therefore, the vehicle air-conditioning system can make the pressure loss coefficient $\zeta$ lower than the conventional vehicle air-conditioning system 50 and thereby cause the vehicle air-conditioning system 1 to operate more effectively.

Although the vehicle air-conditioning system according to an embodiment of the present invention has been described, it is to be noted that the scope of the invention is defined only by the appending claims.

What is claimed is:

1. An air-conditioning system for a vehicle, said system comprising:
   an evaporator for receiving air that is discharged into said system and changing the discharged air to a cold air flow, the cold air flow being directed from said evaporator in a direction rearward of said evaporator;
   a heater located downstream of said evaporator for selectively receiving at least a portion of the cold air flow and heating the at least a portion of the cold air flow to a warm air flow;
   a partition disposed downstream of said heater for directing the warm air flow upwardly so as to permit mixing of the warm air flow through said heater and a remaining portion of the cold air flow that bypasses said heater, said partition including a top end portion which defines a surface having a streamlined or curved configuration along which cold air, warm air or a mixture of cold and warm air can flow;
   a guide adapted to downwardly direct the cold air, the warm air or the mixture of the cold and warm air which has flowed beyond said top end portion of said partition so as to blow the downwardly directed air out of said system; and
   a first damper operable to change a location thereof so as to adjust an amount of the cold air, the warm air or the mixture of the cold and warm air which flows beyond said top end portion of said partition, said first damper including a front end surface which is adapted so as to contact with said streamlined or curved configuration of said top end portion and a rear end surface which is adapted to contact with a vent outlet disposed above said partition, and said front end surface of said first damper being disposed so as to always face said top end portion of said partition even when said first damper changes the position thereof;
   wherein said guide downwardly directs all of the cold air, the warm air or the mixture of the cold and warm air so as to blow the downwardly directed air out of the system when said rear end portion contacts with the vent outlet disposed above said partition.

2. The air-conditioning system according to claim 1, wherein said surface having the streamlined or curved configuration defined by said top end portion comprises substantially an airfoil configuration.

3. The air-conditioning system according to claim 1, further comprising a casing in which said evaporator, said heater, said partition, said guide and said first damper are disposed therein, wherein the air that is discharged into said system is discharged into said casing of said system.

4. The air-conditioning system according to claim 1, further comprising a second damper disposed between said evaporator and said heater, and
   wherein said streamlined or curved configuration of said surface is defined by said top end portion of said partition such that said second damper angularly directs only the cold air flow through said evaporator onto said top end portion of said partition, and the cold air flow flows beyond said top end portion while following said surface defined by said top end portion.

5. The air-conditioning system according to claim 1, further comprising a second damper disposed between said evaporator and said heater, and
   wherein said streamlined or curved configuration of said surface is defined by said top end portion of said partition such that said second damper and said heater direct the warm air flow through said heater toward said top end portion of said partition, and said cold air flows beyond said top end portion while following said surface of said top end portion so as to be turned through 180 degrees.

6. The air-conditioning system according to claim 1, wherein said top end portion of said partition has a radius of curvature ranging between approximately 5 and 25 mm.

7. The air-conditioning system according to claim 1, wherein said top end portion of said partition is bent forwardly toward said first damper.

8. The air-conditioning system according to claim 4, wherein said streamlined or curved configuration of said surface is defined by said top end portion of said partition such that said second damper and said heater direct the warm air flow through said heater toward said top end portion of said partition, and said cold air flows beyond said top end portion while following said surface of said top end portion so as to be turned through 180 degrees.

9. The air-conditioning system according to claim 5, wherein said top end portion of said partition has a radius of curvature ranging between approximately 5 and 25 mm.

10. The air-conditioning system according to claim 9, wherein said surface having the streamlined or curved configuration defined by said top end portion comprises substantially an airfoil configuration.

11. The air-conditioning system according to claim 9, wherein said top end portion of said partition is bent forwardly toward said first damper.

12. The air-conditioning system according to claim 8, wherein said surface having the streamlined or curved configuration defined by said top end portion comprises substantially an airfoil configuration.

13. The air-conditioning system according to claim 8, wherein said top end portion of said partition is bent forwardly toward said first damper.

14. The air-conditioning system according to claim 4, wherein said top end portion of said partition has a radius of curvature ranging between approximately 5 and 25 mm.

15. The air-conditioning system as according to claim 14, wherein said surface having the streamlined or curved configuration defined by said top end portion comprises substantially an airfoil configuration.

16. The air-conditioning system as according to claim 14, wherein said top end portion of said partition is bent forwardly toward said first damper.

17. The air-conditioning system as according to claim 3, wherein said surface having the streamlined or curved configuration defined by said top end portion comprises substantially an airfoil configuration.

18. The air-conditioning system according to claim 3, wherein said top end portion of said partition is bent forwardly toward said first damper.

19. The air-conditioning system according to claim 7, wherein said top end portion of said partition has a radius of curvature ranging between approximately 5 and 25 mm.

20. The air-conditioning system according to claim 19, wherein said surface having the streamlined or curved configuration defined by said top end portion comprises substantially an airfoil configuration.

21. The air-conditioning system according to claim 19, wherein said top end portion of said partition is bent forwardly toward said first damper.

22. An air-conditioning system for a vehicle, said system comprising:
- a casing;
- an evaporator for receiving air that is discharged into said casing and changing the discharged air to a cold air flow, the cold air flow being directed from said evaporator in a direction rearward of said evaporator;
- a heater located downstream of said evaporator for selectively receiving at least a portion of the cold air flow and heating the at least a portion of the cold air flow to a warm air flow;
- a partition disposed downstream of said heater for directing the warm air flow upwardly so as to permit mixing of the warm air flow through said heater and a remaining portion of the cold air flow that bypasses said heater, said partition including a top end portion which defines a surface having a streamlined or curved configuration along which cold air, warm air or a mixture of cold and warm air can flow;
- a guide adapted to downwardly direct the cold air, the warm air or the mixture of the cold and warm air which has flowed beyond said top end portion of said partition so as to blow the downwardly directed air out of said system;
- a first duct defined by said partition and said guide;
- a vent outlet formed in said casing and located above said top end portion of said partition;
- a floor outlet formed in said casing and located at a lower end of said first duct;
- a second duct extending upwardly along a front outer portion of said casing and having a lower end portion which communicates with said lower end portion of said first duct;
- a defrost outlet communicating with said lower end portion of said first duct through said second duct and disposed at an upward end portion of said second duct opposite from said lower end portion of said second duct;
- an air-mixing damper disposed between said evaporator and said heater for adjusting a mixing ratio of the cold air passing only through said evaporator and the warm air passing through said evaporator and said heater;
- a vent damper disposed adjacent to said vent outlet for respectively adjusting an amount of the cold air, the warm air or the mixture of the cold and warm air or an amount of the warm air or the mixture of the cold and warm air discharged from said vent outlet and an amount of the cold air, the warm air or the mixture of the cold and warm air flowing into said first duct; and
- a floor damper disposed so as to communicate with both of said lower end portion of the first duct and said lower end portion of the second duct for respectively adjusting an amount of the cold air, the warm air or the mixture of the cold and warm air discharged from said floor outlet and an amount of the cold air, the warm air or the mixture of the cold and warm air discharged from said defrost outlet;

wherein said top end portion of said partition has a radius of curvature ranging between approximately 5 and 25 mm.

23. The air-conditioning system according to claim 22, wherein said surface having the streamlined or curved configuration defined by said top end portion comprises substantially an airfoil configuration.

24. The air-conditioning system according to claim 22, wherein said streamlined or curved configuration of said surface is defined by said top end portion of said partition such that said air-mixing damper angularly directs only the cold air flow through said evaporator onto said top end portion of said partition, and the cold air flow flows beyond said top end portion while following said surface defined by said top end portion.

25. The air-conditioning system according to claim 22, wherein said streamlined or curved configuration of said surface is defined by said top end portion of said partition such that said air-mixing damper and said heater direct the warm air flow through said heater toward said top end portion of said partition, and said cold air flows beyond said top end portion while following said surface of said top end portion so as to be turned through 180 degrees.

26. The air-conditioning system according to claim 22, wherein said second duct is disposed in front of said evaporator.

27. The air-conditioning system according to claim 22, wherein said top end portion of said partition is bent forwardly toward said vent outlet.

28. The air-conditioning system according to claim 24, wherein said streamlined or curved configuration of said surface is defined by said top end portion of said partition such that said air-mixing damper and said beater direct the warm air flow through said heater toward said top end portion of said partition, and said cold air flows beyond said top end portion while following said surface of said top end portion so as to be turned through 180 degrees.

29. The air-conditioning system according to claim 28, wherein said surface having the streamlined or curved configuration defined by said top end portion comprises substantially an airfoil configuration.

30. The air-conditioning system according to claim 28, wherein said top end portion of said partition is bent forwardly toward said vent outlet.

31. The air-conditioning system according to claim 24, wherein said surface having the streamlined or curved configuration defined by said top end portion comprises substantially an airfoil configuration.

32. The air-conditioning system according to claim 24, wherein said top end portion of said partition is bent forwardly toward said vent outlet.

* * * * *